United States Patent [19]

Mansmann et al.

[11] 4,067,747

[45] Jan. 10, 1978

[54] PRODUCTION OF IMPROVED CHROMIUM OXIDE GREEN PIGMENT

[75] Inventors: Manfred Mansmann; Wolfgang Rambold, both of Krefeld, Germany

[73] Assignee: Bayer Aktiengesellschaft, Leverkusen, Germany

[21] Appl. No.: 656,035

[22] Filed: Feb. 6, 1976

[30] Foreign Application Priority Data

Feb. 15, 1975 Germany .............................. 2506443

[51] Int. Cl.$^2$ .............................................. C09C 1/34
[52] U.S. Cl. ..................................... 106/302; 423/596
[58] Field of Search ................. 106/302; 423/596, 607

[56] References Cited

U.S. PATENT DOCUMENTS

| 1,429,912 | 9/1922 | d'Adrian | 423/607 |
| 2,156,451 | 5/1939 | Grasshoff et al. | 106/302 |
| 3,278,261 | 10/1911 | Kearley | 423/607 |

FOREIGN PATENT DOCUMENTS

| 728,233 | 11/1942 | Germany | 106/302 |

Primary Examiner—Winston A. Douglas
Assistant Examiner—J. V. Howard
Attorney, Agent, or Firm—Burgess, Dinklage & Sprung

[57] ABSTRACT

A process for the production of chromium oxide green pigment comprising heating a mixture of ammonium dichromate with at least the stoichiometrically equivalent quantity of a sodium salt selected from the group consisting of chloride and sulfate over a period of at most about 15 minutes to a pigment-forming temperature of about 800 to 1100° C in the presence of about 1 to 45% water based on the weight of the mixture, calcining the mixture at a temperature in the above-mentioned range, and separating the formed pigment from the salts. The mixture may be formed in situ by reaction of sodium dichromate with ammonium chloride or sulfate in the presence of water. The presence during calcining of organic modifiers such as sawdust or of boron compounds such as borax increases, tinting strength and disproportionately affect color. The pigments are brighter, and of higher tinting strength than heretofore produced.

12 Claims, No Drawings

PRODUCTION OF IMPROVED CHROMIUM OXIDE GREEN PIGMENT

The present invention relates to the production of improved chromium oxide green pigments.

Chromium oxide green is a valid pigment by virtue of its chemical and thermal stability. On account of its somewhat dull, green color, various attempts have been made to obtain a brighter green. Unfortunately, none of these attempts has produced the required results. In addition to color, tinting strength is an important criterion in the practical application of pigments. In practice, pigments with as high a tinting strength as possible are required for economic reasons.

Chromium oxide green is generally produced by reducing an alkali metal chromate, preferably sodium dichromate, calcining the reduction product, and washing, drying and grinding the resulting calcinate. Sulfur for example is a suitable reducing agent. In other known processes, chromium oxide green is obtained by thermally decomposing special Cr(VI)-compounds, for example $CrO_3$ or $(NH_4)_2Cr_2O_7$. All these processes are characterized by the dull color of the resulting chromium oxide. In addition, the $Cr_2O_3$ formed undesirably accumulates in the form of an extremely finely divided, voluminous powder during thermal decomposition of the ammonium dichromate. Owing to its small particle size, this product is not suitable for use as a pigment because it has only a limited tinting strength. Various attempts have already been made to densify the voluminous decomposition product of ammonium dichromate. According to Russian Pat. No. 107,488 for example, sodium dichromate is added in order to obtain a heavier product and to prevent dust problems from arising. According to U.S. Pat. No. 3,278,261, densification is obtained by adding from 0.1 to 5% by weight of an alkali metal halide during the thermal decomposition of ammonium dichromate. Ammonium dichromate itself is a compound which can only be obtained by an elaborate process from sodium chromate or sodium dichromate. To this end, a hot sodium dichromate solution is reacted with a stoichiometric quantity of ammonium chloride or ammonium sulfate, the NaCl or $Na_2SO_4$ formed is filtered off under heat and the ammonium dichromate is subsequently crystallized out by cooling. Handling has to be carried out with extreme caution on account of the danger of violent decomposition of the ammonium dichromate.

Accordingly, attempts have also been made to bypass the production of ammonium dichromate and, instead, to subject a mixture of sodium dichromate and ammonium chloride or ammonium sulfate to heating. This results in the formation of, in addition to $Cr_2O_3$, the corresponding sodium salt which can be removed by washing.

According to U.S. Pat. No. 1,429,912, ammonium sulfate is mixed with twice the quantity of $Na_2Cr_2O_7$, optionally together with a small quantity of water, and the resulting mixture is reacted at 400° C. In the process described in German Pat. No. 728,233, sodium dichromate and ammonium sulfate are mixed in a ratio of 70:30 and the resulting mixture is heated for several hours to a temperature in the range of from 700° to 800° C. It is also not possible by these processes to obtain pigments which are brighter green in color.

The object of the present invention is to provide chromium oxide pigments which are brighter green in color and, at the same time, show high tinting strength.

The present invention relates to a process for the production of chromium oxide green pigment by heating a mixture of ammonium dichromate with an alkali metal salt, in which an intimate mixture, optionally prepared in situ, of ammonium dichromate and at least the stoichiometrically equivalent quantity of sodium chloride and/or sulfate is heated over a period of at most about 15 minutes to pigment forming temperatures in the range of about 800° to 1100° C in the presence of about to 45 % by weight of water, based on the mixture, and optionally in the presence of modifiers, the mixture is calcined at temperatures in the above-mentioned range and the pigment formed is separated off from the salts.

In the most simple embodiment of the process according to the invention, ammonium dichromate and sodium chloride or sulfate are mixed with one another in stoichiometrically equivalent quantities, followed by addition of the requisite quantity of water.

In the context of the invention, the expression "stoichiometrically equivalent quantity" means that 2 moles of sodium ions, in the form of the chloride or sulfate, are added per mole of ammonium dichromate. The above-mentioned stoichiometric ratios in the mixture of ammonium dichromate and the sodium salt are directly obtained during the "in situ" preparation from a mixture of sodium dichromate and ammonium chloride or ammonium sulfate in accordance with equations (1) and (2) below:

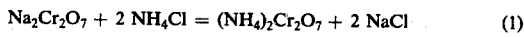

$$Na_2Cr_2O_7 + 2\ NH_4Cl = (NH_4)_2Cr_2O_7 + 2\ NaCl \qquad (1)$$

$$Na_2Cr_2O_7 + (NH_4)_2SO_4 = (NH_4)_2Cr_2O_7 + Na_2SO_4 \qquad (2)$$

In the reactions corresponding to these equations, it is possible to accept small, for example 10%, deviations in either direction. A deficit of ammonium salt is reflected in an undesirable reduction in the $Cr_2O_3$ yield during pigment formation, while an excess results in losses through evaporation of the excess ammonium salts and in condensation in following parts of the apparatus used. It is particularly advantageous to carry out these reactions in the presence of the quantity of water required for calcination to form the pigment.

In addition to the stoichiometrically equivalent quantity of sodium chloride or sodium sulfate, which is preferably formed in the mixture in accordance with equation (1) or (2), more sodium chloride or sodium sulfate may be added to the mixture in up to about twice the quantity. In the case of sodium chloride in particular, a further addition contributes towards favorably influencing tinting strength. In general, as little as about 10 to 20% above the stoichiometrically equivalent quantity is adequate for this purpose.

It is favorable to add the water in a quantity of about 1 to 45% by weight, based on the mixture. The quantity of water used preferably amounts to between about 10 and 40% by weight and, with particular preference, to between about 20 and 30% by weight.

In one preferred embodiment of the process according to the invention, the intimate mixture of ammonium dichromate and sodium chloride or sodium sulfate is obtained by intensively mixing a concentrated aqueous solution of sodium dichromate with the solid, finely ground ammonium salt, especially under heat. The desired mixture is practically completely formed without any need for isolation of the ammonium dichromate (preparation of the mixture "in situ"). This is of importance to the quality of the pigment ultimately formed because, in the event of incomplete reaction, for example as a result of poor mixing or as a result of using coarse ammonium salt, pigments of poorer quality are obtained. Suitable mixers are, for example, dissolver discs, propeller stirrers or the like, or even mixing screws. The particle size of the ammonium sulfate or chloride used is important. Particularly good results are obtained with particle sizes of substantially less than about 0.5 mm and preferably less than about 0.25 mm. If the particle size is substantially greater than about 1 mm, distinctly poorer pigments are obtained. Concentrations of the aqueous sodium dichromate solution of from about 1100 g of $Na_2Cr_2O_7 \cdot 2 H_2O/l$ to about 1600 g of $Na_2Cr_2O_7 \cdot 2 H_2O/l$ having proved to be particularly suitable. The mixing temperatures are in the range of from about 30° C to the boiling temperature of the mixture, while the mixing times range from about 10 minutes to 2 hours. In the event of prolonged heating, it is essential to avoid excessive evaporation of water by known measures, for example by using reflux condensers, because otherwise the mixture can no longer be stirred. Mixing in this way in the concentration range indicated results in the formation of a paste which flows freely under heat and which may either be transported as such to the kiln or which, by slight cooling, forms a more or less stiff paste or even a solid cake, depending on its water content. The cake may then be broken up and introduced into the kiln in lump form. In cases where the starting solution has a lower concentration of sodium dichromate, concentration up to the required water content may be obtained by evaporation during the mixing process.

In another embodiment, the intimate mixture of the components, ammonium dichromate and sodium chloride and/or sodium sulfate, may be obtained by mixing an aqueous concentrated sodium dichromate solution, preferably heated to temperatures up to boiling temperature, with an aqueous concentrated ammonium sulfate solution, and subsequently spray-drying the resulting mixture, the temperature of the dried mixture being kept below about 150° C. The spray-dried product contains the compounds ammonium dichromate and sodium chloride or sodium sulfate in fine distribution. Before introduction into the kiln, the finely divided material is granulated with water or with an aqueous solution of sodium dichromate and ammonium salt. From 1 to 45% by weight of water are added, based on the intimate mixture of ammonium dichromate with sodium salt. On the one hand, this facilitates dosing and, hence, charging of the kiln. On the other hand, the color properties of the pigment are brought to the required high level by the presence of the water during the subsequent calcination stage.

However, it is not sufficient, for the production of chromium oxides with a bright, saturated color and a high tinting strength, to prepare a water-containing mixture of $(NH_4)_2Cr_2O_7$ and sodium salt and to subject the resulting mixture to calcination under any conditions as described above. Instead calcination has to be carried out under specific conditions in order to obtain pigments with the required high tinting strength and with a saturated, bright pure color. It has been found that gradual heating of the mixture to the pigment-forming temperature gives much poorer pigments than rapid heating. Gradual heating is obvious from the technical point of view because, for example in cases where a tubular rotary kiln is used, the starting mixture can be introduced at its cold end and the material passed through the kiln in countercurrent to the firing gases. This guarantees particularly favorable heating from the point of view of energy consumption.

If, instead, the mixture is directly introduced into the hot kiln so that it is quickly heated to the pigment-forming temperature, for example over a period of time ranging from a few seconds up to about 15 minutes, the high-quality pigments according to the invention are obtained.

Heating of the mixture in accordance with the invention may be carried out by directly introducing the mixture into the hot zone of a rotary tube or onto the hot plate of a disc-type kiln or a rotary annular kiln (German Offenlegungsschrift No. 2,320,806) whose plate is kept at the requisite temperature. For smaller quantities, it is possible to use muffle kilns with an adequate heat capacity into which the starting mixture is introduced at the pigment-forming temperature. In the context of the invention, the pigment-forming temperature is a temperature range in which high-quality pigments can be formed providing the conditions referred to above are maintained. This temperature range is from about 800° to about 1100° C. A longer residence time amounting to a few hours is necessary at the lower end of this range, while a shorter residence time amounting to a few minutes is required at the upper end of this temperature range. The pigment forming temperature is preferably between 900° and 1000° C for residence times of from about 10 minutes to 1 hour.

After calcination the pigment is worked up in the usual way. The process according to the invention has another advantage in this respect, namely that the products of calcination are extremely easy to break up and decompose very quickly in water, the soluble salts being quickly dissolved. In contrast to conventionally produced decomposition products of ammonium dichromate, the filterability of the chromium oxide pigment obtained in accordance with the invention is extremely good. After filtration, the products are dried and conventionally ground. However, grinding may also be carried out in suspension, for example before filtration or before drying.

In a modification of the process according to the invention, so-called modifiers are added at any stage of the pigment forming process before calcination of the $(NH_4)_2Cr_2O_7$/sodium salt mixture. These modifiers are primarily organic additives. Inexpensive waste or natural products, for example wood cuttings, sawdust, lignin or starch, are preferred for economic reasons.

Even small quantities, for example about 1% by weight, based on the quantity of ammonium dichromate and sodium salt, are effective in further increasing coloring strength with a slight change in color to a yellower green, while larger quantities (about 5 to 20% by weight) reduce the lightness of the products to the level of known chromium oxide pigments without at the same time reducing saturation to their level. Another effect of the organic modifiers is that, even in cases where slightly longer heating periods are required to reach the pigment-forming temperature, pigments with favorable properties are still obtained.

Inorganic boron compounds such as, for example, boric acid or alkali borates, have proved to be effective as further modifiers. It is possible by adding modifiers of this kind to change the color of the pigment to a more blueish green. Additions of about 1 to 20% by weight of borax, based on the ammonium dichromate and sodium salt, have proved to be effective. The best results are obtained with additions of borax of about 2 to 10% by weight.

The favorable properties of the pigments produced in accordance with the invention appear to be attributable to their narrow grain-size distribution, although this is by no means intended to be interpreted as a definite theory. Photographs of the pigments according to the invention taken with an electron microscope reveal a superior uniformity of the particles in relation to known products.

In addition to their improved color properties, the new products show other improved pigment properties, for example hiding power, dispersibility, gloss and gloss retention.

The invention is illustrated by the following Examples. As is normally the case in the assessment of pigments, a reference sample is used as a standard for assessing the properties of the products according to the invention. Accordingly, the results are based on that standard. A chromium oxide green produced in accordance with the prior art was used as the standard. It was produced by reducing an alkali metal chromate with sulfur and calcining the reduction product, followed by washing, drying and grinding.

The tinting strength was determined on a rutile blend (ratio 1:5) in a lacquer in accordance with DIN 53 234. These values are highly consistent with the determination of the standard depth of color 1:25 according to DIN 53 235. The standard used has a tinting strength of 100. The tinting strengths of the products produced in accordance with the invention are standardized to that level.

The color distances of the products in relation to the standard were determined in accordance with DIN 6174. The following color distances in the color space according to the invention were obtained in accordance with Adams-Nickerson:

$\Delta E_{AN}$: total color distance in AN-units
$\Delta_\phi$: > 0 bluer than standard, < 0 yellower than standard
$\Delta A_S$: saturation difference (> 0 = more saturated than standard)
$\Delta A_L$: lightness difference (> 0 = lighter than standard)
0.5 $\Delta$-units correspond to about 1 eye threshold.

The measurements were carried out with an Elrepho three-filter photometer of the type manufactured by the Zeiss company (without a gloss diaphragm) and with a type DMC 25 spectral photometer manufactured by the Zeiss company (with a gloss diphragm).

Unless otherwise indicated, 1 mole of dichromate was used in each of the following tests. The percentage additions are based on the quantity of anhydrous dichromate and the stoichiometrically equivalent chloride or sulfate. The mixtures were spread out on flat quartz glass dishes in a thickness of 1 to 2 cm and placed in the muffle furnace preheated to the calcination temperature (for example 950° C). In the material, the temperature of 950° C is reached within 15 minutes and is maintained for the periods indicated in the Examples, followed by removal of the dish from the hot furnace. After cooling, the product is washed with a total of 5 liters of water and dried at 120° C. The conversion is analytically determined in the first filtrate by titrating the quantity of Cr(VI) still present. The results of the test are set out in the table.

COMPARISON EXAMPLE A

Ammonium dichromate with a grain size of about 1 to 2 mm was dried for 8 hours at 80° C and then dry-mixed with very finely divided sodium sulfate in a molar ratio of 1 : 1 Calcination conditions: 1 hour at 950° C.

COMPARISON EXAMPLE B

The procedure was as in Comparison Example A, except that the mixture was finely ground in a cross-beater mill.

EXAMPLE 1

The procedure was as in Comparison Example B, except that 12 g of water, corresponding to 3%, were added after grinding.

EXAMPLE 2

The procedure was as in Comparison Example B, except that 50 g of water, corresponding to 12.7%, were added after grinding followed by mixing to form a homogeneous paste.

EXAMPLE 3

The procedure was as in Comparison Example B, except that 15 g of water, corresponding to 3.8%, and 5 g of conifer sawdust, corresponding to 1.3%, were added after grinding, followed by homogeneous mixing.

EXAMPLE 4

The procedure was as in Example 3, except that, instead of 1 mole, 1.30 moles of $Na_2SO_4$ were used.

EXAMPLE 5

The procedure was as in Example 4, except that 1.75 moles of $Na_2SO_4$ were used.

EXAMPLE 6

The procedure was as in Example 3, except that 2 moles of fine sodium chloride were used instead of 1 mole of $Na_2SO_4$.

COMPARISON EXAMPLE C $Na_2Cr_2O_7$, grain size 1 - 2 mm, was ground for 16 hours in a ball mill with solid $(NH_4)_2SO_4$, grain size 0.5 - 3 mm, in a molar ratio of 1 : 1, followed by heating for 2 hours at 950° C.

EXAMPLE 7

$Na_2Cr_2O_7 . 2 H_2O$ was mixed with $NH_4Cl$ in a molar ratio of 1:2.1 and 33 g of water, corresponding to 18.7% of $H_2O$ including the water of cystallization of $Na_2Cr_2O_7 . 2H_2O$, were added to the resulting mixture which was then mixed in a cross-beater mill to form a homogeneous paste. Calcination conditions: 1 hour at 950° C.

EXAMPLE 8

The procedure was as in Example 7, except that calcination was carried out for 1 hour at 800° C.

COMPARISON EXAMPLE D

The procedure was as in Example 7, except that calcination was carried out for 1 hour at 700° C. The product was now grey-green in color and showed distinct tinges of brown in the white blend.

EXAMPLE 9

The procedure was as in Example 7, except that 21 g of NaCl and 21 g of borax, $Na_2B_4O_7 \cdot 10 H_2O$, corresponding to 5.7% in each case, were additionally added to the mixture. Calcination conditions: 1 hour at 950° C

EXAMPLE 10

$Na_2Cr_2O_7 \cdot 2 H_2O$ and $NH_4Cl$ in a molar ratio of 1 : 1.9 were processed to form a homogeneous paste in a crossbeater mill together with 5.7% of borax, 5.7% of NaCl and 2.4% of oxylignin in the presence of 20 g of water, corresponding to 15.2% of $H_2O$ including the water of crystallization of $Na_2Cr_2O_7 \cdot 2 H_2O$. Calcination conditions: 1 hour at 950° C.

EXAMPLE 11

A solution of 1600 g of $Na_2Cr_2O_7 \cdot 2 H_2O/l$ and $NH_4Cl$ in a molar ratio of 1 : 2.1 together with 20 g of conifer sawdust, corresponding to 5.4%, was processed at 100° C in a high-speed dissolver to form a homogeneous paste. Calcination conditions: 1 hour at 950° C.

EXAMPLE 12

The procedure was as in Example 11, except that calcination was carried out for 1 hour at 1050° C.

COMPARISON EXAMPLE E

The $Na_2Cr_2O_7 \cdot 2 H_2O$ (grain size 1 - 2 mm) and $(NH_4)_2SO_4$ (grain size 0.5 - 3 mm) in a molar ratio of 1 : 1.05 were ground for 16 hours in a ball mill. Calcination conditions: 1 hour at 900° C.

COMPARISON EXAMPLE F

The procedure was as in Comparison Example E, except that 133 g of water were additionally introduced into the ball mill, so that a thick paste was obtained.

EXAMPLE 13

1 mole of a 40% $(NH_4)_2SO_4$ solution (330 g) was mixed at 100° C with the stoichiometric quantity of solid $Na_2Cr_2O_7 \cdot 2 H_2O$ in a high-speed dissolver, followed by processing to form a homogeneous paste. Calcination conditions: 1 hour at 950° C.

EXAMPLE 14

The procedure was as in Example 13, except that 5 g of confier sawdust, corresponding to 1.3%, were additionally added to the mixture.

EXAMPLE 15

$(NH_4)_2SO_4$ (grain size less than 0.2 mm) was added at 100° C to a hot sodium dichromate solution containing 1560 g of $Na_2Cr_2O_7 \cdot 2 H_2O/l$ in a molar ratio of 1 : 1, followed by processing at that temperature in a high-speed dissolver to form a homogeneous paste. Calcination conditions: 1 hour at 950° C.

EXAMPLE 16

The procedure was as in Example 15, except that the concentration of the dichromate solution amounted to 1150 g of $Na_2Cr_2O_7 \cdot 2 H_2O/l$.

EXAMPLE 17

The procedure was as in Example 15, except that the calcination time was only 15 minutes.

EXAMPLE 18

The procedure was as in Example 16, except that 25 g of conifer sawdust, corresponding to 6.3%, were additionally added to the paste.

EXAMPLE 19

The procedure was as in Example 15, except that 8 g of $Na_2B_4O_7 \cdot 10 H_2O$, corresponding to 2.0%, were additionally added to the paste.

EXAMPLE 20

The procedure was as in Example 15, except that the concentration of the dichromate solution amounted to 1300 g of $Na_2Cr_2O_7 \cdot 2 H_2O/l$, and 50 g of $H_3BO_3$, corresponding to 12.7%, were additionally added.

COMPARISON EXAMPLE G

The procedure was as in Example 15, except that heating was carried out by introducing the mixture into the cold muffle furnace and heating it under full load. A temperature of 80° C was reached after 15 minutes, a temperature of 230° C after 30 minutes, a temperature of 470° C after 45 minutes, a temperature of 700° C after 60 minutes and a temperature of 950° C after 80 minutes. After a further 30 minutes at 950° C, the reaction mixture was removed from the furnace and worked up in the usual way.

COMPARISON EXAMPLE H

The procedure was as in Comparison Example G, except that the mixture according to Example 19 additionally containing 1.3% of sawdust was used as the mixture.

COMPARISON EXAMPLE I

Spray-dried anhydrous $Na_2Cr_2O_7$ (grain size less than 0.1 mm) and $(NH_4)_2SO_4$ (grain size less than 0.2 mm) in a molar ratio of 1 : 1 were ground for 1 hour in a ball mill. Calcination conditions: 1 hour at 950° C.

EXAMPLE 21

A dichromate solution containing 1400 g of $Na_2Cr_2O_7 \cdot 2 H_2O/l$ was mixed in a molar ratio of 1 : 1 with a commercial-grade 40% ammonium sulfate solution of the type formed during the Beckmann re-arrangement of cyclohexanone oxime into ε-caprolactam in oleum, and the resulting mixture was spray-dried in a conventional spray dryer. The heating gas temperature (400° C) was adjusted in such a way that the dry material accumulating contained no more water. The temperature of the dry material amounted to 150° C at the outlet end of the dryer and to between 110° and 120° C in the filter. The dust-fine product was converted into granules 0.5 - 2 mm in diameter by the addition of 12% of water which was sprayed onto the product on a granulating plate. The granules were heated for 1 hour at 950° C in the usual way by introduction into the preheated furnace.

EXAMPLE 22

To prepare a larger mixture, a 25 liter capacity vessel with a double jacket for steam heating and with a cover was used, the vessel being provided with a cross blade whose shaft was introduced through the bottom of the vessel and was driven at a variable speed. Like the vessel itself, the bottom oulet was heated. A homogeneous mixture of 5.6 liters of a dichromate solution with a concentration of 1600 g of $Na_2Cr_2O_7 \cdot 2\ H_2O/l$ (=30 moles) and 3.97 kg of $(NH_4)_2SO_4$ (= 30 moles), grain size less than 0.1 mm, was obtained in this vessel by stirring for 30 minutes at 100° C. The free-flowing homogeneous paste was then poured out onto plates where it quickly hardened on cooling. The cakes were broken up into cm-large lumps and used for calcination.

A proportion (500g) was used for calcining the mixture for 1 hour at 950° C in the usual way.

EXAMPLE 23

The lump-form starting mixture prepared in Example 22 was introduced at a rate of 1.5 kg/hour into an electrically heated rotary tubular kiln with an internal diameter of 12 cm and a heated length of 100 cm rotating at 1 revolution per minute. The temperature of the material in the hottest zone was 950° C. In this Example, the point at which the material was introduced into the kiln was selected in such a way that the starting material was directly introduced into the hottest zone.

Table

| No. | Conversion % | Tinting Strength | Color Distances in the Full Tone ||||
|---|---|---|---|---|---|---|
| | | | $\Delta E_{AN}$ | $\Delta \rho$ | $\Delta A_S$ | $\Delta A_L$ |
| A | 98.7 | 78 | 3.2 | −0.3 | 2.0 | 2.6 |
| B | 99.0 | 73 | 4.8 | 1.1 | 1.8 | 4.5 |
| 1 | 99.3 | 121 | 4.9 | 0.3 | 3.3 | 3.6 |
| 2 | 99.3 | 125 | 5.1 | 0.1 | 3.1 | 4.0 |
| 3 | 99.3 | 118 | 5.8 | −0.1 | 4.2 | 4.0 |
| 4 | 99.0 | 118 | 4.7 | −0.4 | 3.6 | 3.0 |
| 5 | 99.3 | 115 | 5.0 | 0.1 | 3.4 | 3.7 |
| 6 | 96.7 | 108 | 5.1 | 0.0 | 4.0 | 3.2 |
| C | 93.8 | 79 | dirty, unsaturated ||||
| 7 | 98.2 | 103 | 5.0 | 0.3 | 2.0 | 4.6 |
| 8 | 98.7 | 101 | 3.6 | 2.6 | −1.5 | 3.1 |
| D | 99.0 | 100 | 5.5 | 7.3 | −4.6 | 1.1 |
| 9 | 96.5 | 112 | 5.2 | 2.5 | 2.7 | 4.3 |
| 10 | 92.5 | 117 | 4.4 | 1.2 | 3.3 | 2.9 |
| 11 | 97.8 | 124 | 3.9 | −1.0 | 2.1 | 3.2 |
| 12 | 97.5 | 108 | 4.2 | −1.7 | 2.7 | 3.1 |
| E | 99.8 | 80 | 4.2 | 5.9 | −3.5 | 0.6 |
| F | 99.8 | 86 | 5.5 | 7.4 | −4.8 | 0.1 |
| 13 | 98.8 | 110 | 4.4 | 0.0 | 2.8 | 3.5 |
| 14 | 99.0 | 110 | 3.7 | 0.0 | 2.9 | 2.3 |
| 15 | 99.6 | 118 | 4.3 | −0.7 | 3.0 | 3.0 |
| 16 | 98.9 | 115 | 5.5 | −0.2 | 3.2 | 4.5 |
| 17 | 99.0 | 113 | 4.3 | −0.5 | 2.3 | 3.7 |
| 18 | 99.0 | 101 | 0.8 | −0.8 | 0.7 | −0.1 |
| 19 | 98.5 | 100 | 6.0 | 3.4 | 3.1 | 4.9 |
| 20 | 99.5 | 101 | 4.3 | 1.1 | 4.0 | 4.3 |
| G | 99.7 | 100 | 3.7 | 2.0 | −2.1 | 2.9 |
| H | 99.4 | 113 | 3.0 | −0.3 | 0.7 | 2.9 |
| I | 99.4 | 104 | 2.4 | 1.2 | −0.9 | 2.2 |
| 21 | 99.4 | 114 | 4.9 | 0.4 | 2.8 | 4.0 |
| 22 | 99.1 | 132 | 4.0 | −0.5 | 2.9 | 2.8 |
| 23 | 98.7 | 115 | 2.8 | 0.3 | 1.8 | 2.2 |

It will be appreciated that the instant specification and examples are set forth by way of illustration and not limitation, and that various modifications and changes may be made without departing from the spirit and scope of the present invention.

What is claimed is:

1. A process for the production of chromium oxide green pigment comprising reacting aqueous solutions of sodium dichromate and ammonium sulfate in substantially stoichiometric amount and removing excess water by evaporation thereby to produce a mixture of ammonium dichromate with sodium sulfate, heating the mixture over a period of at most about 15 minutes to a pigment-forming temperature of about 800° to 1100° C in the presence of about 1 to 45% water based on the weight of the mixture, calcining the mixture at a temperature in the above-mentioned range, and separating the formed pigment from the salts.

2. A process as claimed in claim 1, wherein at least one organic modifier is added to the mixture before it is heated to pigment-forming temperature in a quantity of about 1 to 20% by weight of ammonium dichromate + sodium sulfate.

3. A process as claimed in claim 1, wherein at least one boron compound is added to the mixture in a quantity of about 1 to 20% by weight of ammonium dichromate + sodium sulfate.

4. A process as claimed in claim 3, wherein borax is added to the mixture in a quantity of about 2 to 10% by weight of ammonium dichromate + sodium sulfate.

5. A process as claimed in claim 1, wherein the mixture is directly introduced into the hot zone of a rotary tubular kiln, a disc-type kiln or a rotary annular kiln, which hot zone is at a temperature of about 800° to 1100° C.

6. A process as claimed in claim 1, wherein, the water is present in about 10 to 30%, based on the weight of ammonium dichromate + sodium sulfate, there is added to the mixture before it is heated to pigment-forming temperature at least one modifier selected from the group consisting of (A) about 1 to 20% of wood cuttings, sawdust, lignin or starch, and (B) about 2 to 10% of borax, and the mixture is directly introduced into the hot zone of a rotary tubular kiln, a disc-type kiln or a rotary annular kiln, which hot zone is at a temperature of about 800° to 1100° C.

7. A process for the production of chromium oxide green pigment comprising reacting an aqueous solution containing about 1100 to about 1600 g of $Na_2Cr_2O_7 \cdot 2\ H_2O/l$ with substantially the equivalent amount of solid ammonium chloride or ammonium sulfate with a particle size of less than about 0.5 mm at a temperature up to the boiling temperature of the aqueous solution thereby to produce a mixture of ammonium dichromate with sodium chloride or sodium sulfate, heating the mixture over a period of at most about 15 minutes to a pigment-forming temperature of about 800° to 1100° C in the presence of about 1 to 45% water based on the weight of the mixture, calcining the mixture at a temperature in the above-mentioned range, and separating the formed pigment from the salts.

8. A process as claimed in claim 7, wherein at least one organic modifier is added to the mixture before it is heated to pigment-forming temperature in a quantity of about 1 to 20% by weight of ammonium dichromate + sodium chloride or sodium sulfate.

9. A process as claimed in claim 7, wherein at least one boron compound is added to the mixture in a quantity of about 1 to 20% by weight of ammonium dichromate + sodium chloride or sodium sulfate.

10. A process as claimed in claim 9 wherein borax is added to the mixture in a quantity of about 2 to 10% by weight of ammonium dichromate + sodium chloride or sodium sulfate.

11. A process as claimed in claim 7, wherein the mixture is directly introduced into the hot zone of a rotary tubular kiln, a disc-type kiln or a rotary annular kiln, which hot zone is at a temperature of about 800° to 1100° C.

12. A process as claimed in claim 7, wherein the water is present in about 10 to 30%, based on the weight of ammonium dichromate + sodium chloride or sodium sulfate, there is added to the mixture before it is heated to pigment-forming temperature at least one modifier selected from the group consisting of (A) about 1 to 20% of wood cuttings, sawdust, lignin or starch, and (B) about 2 to 10% of borax, and the mixture is directly introduced into the hot zone of a rotary tubular kiln, a disc-type kiln or a rotary annular kiln, which hot zone is at a temperature of about 800° to 1100° C.

* * * * *